US008665523B2

(12) United States Patent
Hattori et al.

(10) Patent No.: US 8,665,523 B2
(45) Date of Patent: Mar. 4, 2014

(54) MULTILAYER 3D FLOATING IMAGES IN A SINGLE SUBSTRATE

(75) Inventors: Jiro Hattori, Kanagawa (JP); Yoichiro Mizumoto, Kanagawa (JP)

(73) Assignee: 3M Innovative Properties Company, Saint Paul, MN (US)

( * ) Notice: Subject to any disclaimer, the term of this patent is extended or adjusted under 35 U.S.C. 154(b) by 387 days.

(21) Appl. No.: 13/230,063

(22) Filed: Sep. 12, 2011

(65) Prior Publication Data

US 2013/0065203 A1 Mar. 14, 2013

(51) Int. Cl.
*G02B 27/10* (2006.01)

(52) U.S. Cl.
USPC ........... 359/621; 359/619; 359/620; 359/622; 359/626; 428/195.1; 355/77; 430/292

(58) Field of Classification Search
USPC ........... 359/619–622, 626, 530; 430/8, 270.1, 430/292, 320–322; 355/77; 347/224; 434/150; 156/230, 275.7; 428/195.1
See application file for complete search history.

(56) References Cited

U.S. PATENT DOCUMENTS

| | | | |
|---|---|---|---|
| 3,895,867 A * | 7/1975 | Lo et al. ........................ | 355/77 |
| 6,288,842 B1 * | 9/2001 | Florczak et al. .............. | 359/619 |
| 7,068,434 B2 * | 6/2006 | Florczak et al. .............. | 359/626 |
| 7,336,422 B2 * | 2/2008 | Dunn et al. ................... | 359/626 |
| 7,800,825 B2 * | 9/2010 | Brooks et al. ................ | 359/619 |
| 7,981,499 B2 * | 7/2011 | Endle et al. ................. | 428/195.1 |
| 7,995,278 B2 * | 8/2011 | Endle et al. ................. | 359/620 |
| 8,111,463 B2 * | 2/2012 | Endle et al. ................. | 359/620 |
| 8,514,493 B2 * | 8/2013 | Endle et al. ................. | 359/619 |
| 8,537,470 B2 * | 9/2013 | Endle et al. ................. | 359/620 |

FOREIGN PATENT DOCUMENTS

| | | |
|---|---|---|
| JP | 5-101163 | 4/1993 |
| JP | 8-63096 | 3/1996 |
| JP | 2001-325619 | 11/2001 |
| JP | 2003-166836 | 6/2003 |
| JP | 2004-309869 | 11/2004 |
| WO | WO 01/63341 | 8/2001 |
| WO | WO 2008/070401 | 6/2008 |
| WO | WO 2008/118862 | 10/2008 |
| WO | WO 2009/009258 | 1/2009 |
| WO | WO 2010/104827 | 9/2010 |

* cited by examiner

*Primary Examiner* — Loha Ben
(74) *Attorney, Agent, or Firm* — Lance L. Vietzke

(57) ABSTRACT

A multilayer sheeting with a 3D floating image. The sheeting includes a layer of microlenses and a multilayer material disposed adjacent the microlenses. The multilayer material includes multiple adjacent layers having X-Y planar positions and a Z-direction orthogonal to the X-Y planar positions. Individual images, which contrast with the material, are formed in the multilayer material and include connected elements at interfaces between the multiple layers and conjunction elements between connected elements. The connected elements are registered in the Z-direction at the X-Y planar positions in the interfaces between the layers. The individual images collectively form a composite 3D image that appears to the unaided eye to be three-dimensional and floating above or below the sheeting, or both.

10 Claims, 3 Drawing Sheets

MULTILAYER 3D FLOATING IMAGES IN A SINGLE SUBSTRATE

BACKGROUND

Maps describing multilayer infrastructure of urban cities tend to use multiple separate static maps, one map for each level of the infrastructure. For example, maps of subway stations include one individual map for each floor of the station. Users of the subway station must visualize how the separate maps fit together, the registration among them, in order to navigate the station among its multiple levels or floors.

Computer monitors or other electronic display devices can show multilayer infrastructure with additional information. For example, they can show a 3D representation and allow a user to interact with the display in order to manipulate the displayed image such as rotating the displayed image, or expanding or contracting the displayed image. However, these methods for showing multilevel infrastructure are more expensive and less portable than static maps.

A need exists to better represent multilayer infrastructure, or other multilayer information, in a static map.

SUMMARY

A multilayer sheeting with a 3D floating image, consistent with the present invention, includes at least one layer of microlenses and a multilayer material disposed adjacent the layer of microlenses. The multilayer material includes multiple adjacent layers having X-Y planar positions and a Z-direction orthogonal to the X-Y planar positions. Individual images are formed in the multilayer material associated with the plurality of the microlenses. The individual images contrast with the material and include connected elements at interfaces between the multiple layers and conjunction elements between the connected elements. The connected elements are registered in the Z-direction at the X-Y planar positions in the interfaces between the layers. The individual images collectively form a composite 3D image that appears to the unaided eye to be three-dimensional and floating above or below the sheeting, or both.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Figure 1:
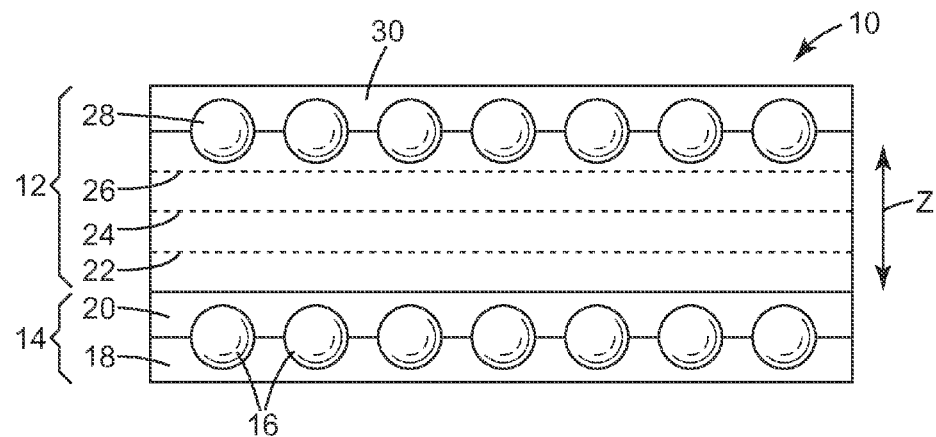
FIG. 1 is a side sectional view of a substrate for the 3D floating image multilayer film.

FIG. 1 is a side sectional view of a substrate 10 for the 3D floating image multilayer film. Substrate 10 includes a reflective film 14 having an array of microlenses 16 embedded in a material 18, and a protective overcoat 20. Film 14 can be implemented with retroreflective sheeting such as one of the SCOTCHLITE Products by 3M Company. Substrate 10 also includes a floating image film 12 adhered to reflective film 14 such as through a lamination process. Floating image film 12 includes an array of microlenses 28 embedded in a radiation sensitive multilayer material represented by layers forming interfaces 22, 24, and 26, and a protective overcoat 30. Three layers are shown for illustrative purposes only, and any number of layers can be used depending upon, for example, an image to be created. The layers can be formed of a continuous material segmented into interfaces established at various planes in the Z-direction, or the layers can be individual layers formed on top of one another to create the interfaces. Examples of floating image films, including types of microlenses and radiation sensitive materials for them, are described in U.S. Pat. No. 6,288,842, which is incorporated herein by reference as if fully set forth.

Figure 2:
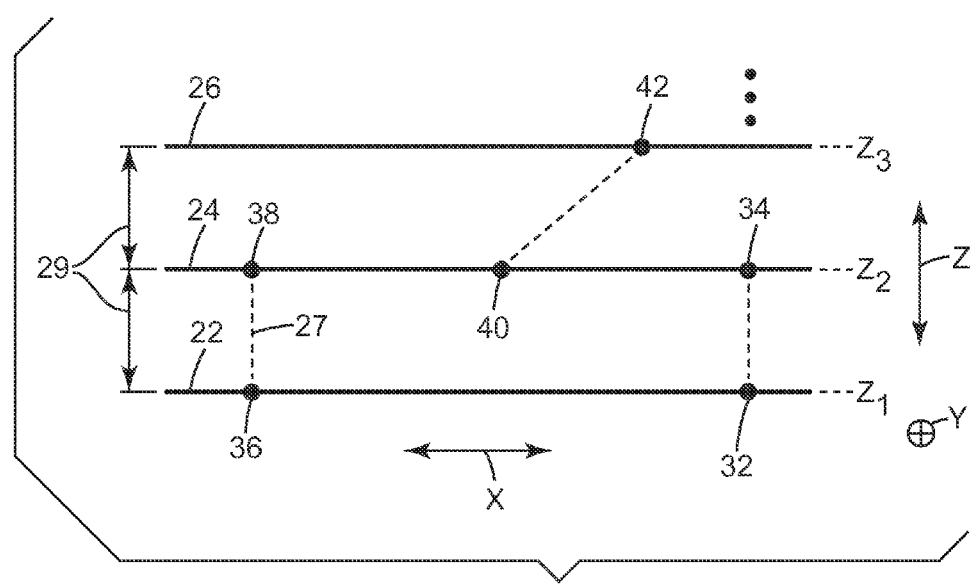
FIG. 2 is a side view illustrating Z-axis registration of connected elements in the multilayer film.
Figure 3:
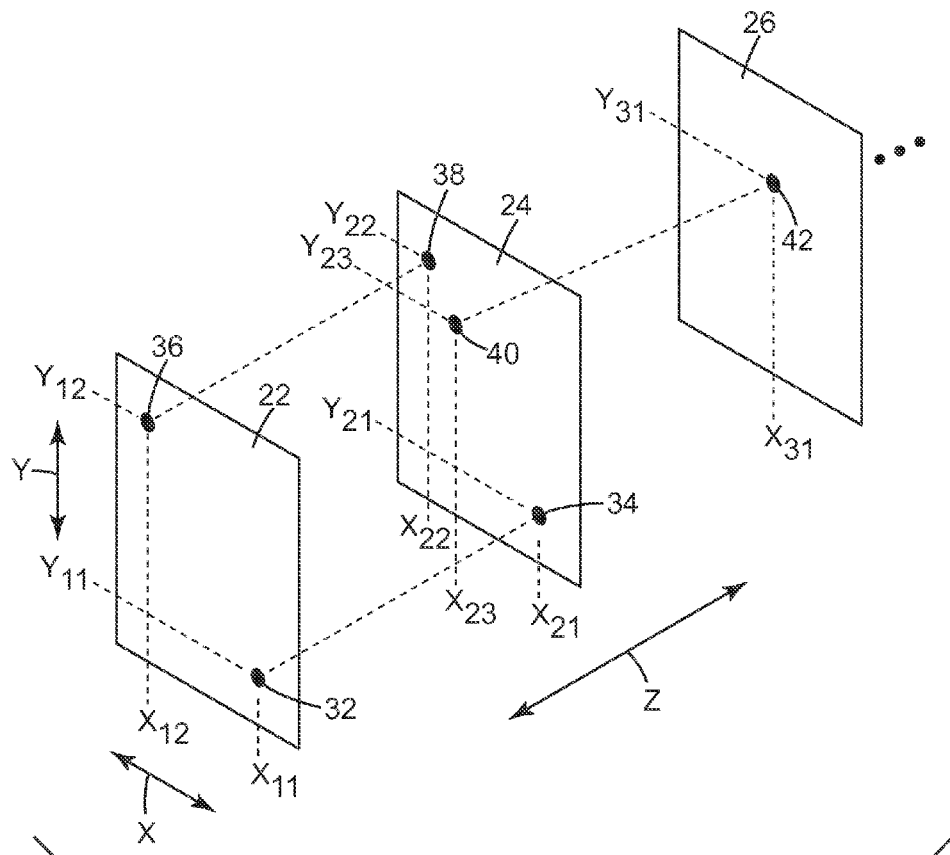
FIG. 3 is a perspective view illustrating Z-axis registration of connected elements in the multilayer film.

FIGS. 2 and 3 are side and perspective views, respectively, illustrating Z-axis registration of connected elements in floating image film 12. Interface 22 has connected elements 32 and 36. Interface 24 has connected elements 34, 38, and 40. Interface 26 has connected element 42. The connected elements are joined by conjunction elements; for example, connected elements 36 and 38 are joined by conjunction element 27. The connected elements are registered in the Z-direction (along the Z-axis) at the interfaces between the layers in order for the composite 3D image to appear as desired. Without Z-direction registration, for example, a conjunction element may stop short of or extend beyond its intended connected element, in which case the resulting 3D image may not appear as desired. As shown in FIG. 3, in order to provide for the Z-axis registration, the X-Y-Z positions are maintained when forming the 3D images in the radiation sensitive layers. When forming connected elements 32 and 34, point $X_{11}$-$Y_{11}$ (level $Z_1$) connects with point $X_{21}$-$Y_{21}$ (level $Z_2$). When forming connected elements 36 and 38, point $X_{12}$-$Y_{12}$ (level $Z_1$) connects with point $X_{22}$-$Y_{22}$ (level $Z_2$). When forming connected elements 40 and 42, point $X_{23}$-$Y_{23}$ (level $Z_2$) connects with point $X_{31}$-$Y_{31}$ (level $Z_3$). Tables 1 and 2 illustrate a data structure for mapping of associated image points, connected elements, and conjunction elements for use in forming the 3D image.

TABLE 1

| Interface | Z-Axis Position | Image Point Positions |
|---|---|---|
| 1 | $Z_1$ | $X_{11}$-$Y_{11}$, $X_{12}$-$Y_{12}$, $X_{13}$-$Y_{13}$, ... $X_{1n}$-$Y_{1n}$ |
| 2 | $Z_2$ | $X_{21}$-$Y_{21}$, $X_{22}$-$Y_{22}$, $X_{23}$-$Y_{23}$, ... $X_{2n}$-$Y_{2n}$ |
| 3 | $Z_3$ | $X_{31}$-$Y_{31}$, $X_{32}$-$Y_{32}$, $X_{33}$-$Y_{33}$, ... $X_{3n}$-$Y_{3n}$ |
| ... | ... | ... |
| N | $Z_N$ | $X_{N1}$-$Y_{N1}$, $X_{N2}$-$Y_{N2}$, $X_{N3}$-$Y_{N3}$, ... $X_{Nn}$-$Y_{Nn}$ |

TABLE 2

| Connected Interfaces | Connected Elements | Conjunction Element |
|---|---|---|
| 1-2 | $X_{11}$-$Y_{11}$ to $X_{21}$-$Y_{21}$ | Element 11 |
| 1-2 | $X_{12}$-$Y_{12}$ to $X_{22}$-$Y_{22}$ | Element 12 |
| ... | ... | ... |
| 2-3 | $X_{21}$-$Y_{21}$ to $X_{31}$-$Y_{31}$ | Element 21 |
| 2-3 | $X_{22}$-$Y_{22}$ to $X_{32}$-$Y_{32}$ | Element 22 |
| ... | ... | ... |
| (N − 1)-N | $X_{(N-1)1}$-$Y_{(N-1)1}$ to $X_{N1}$-$Y_{N1}$ | Element N1 |

The connected elements in the film can be located at various X-Y planar positions among the interfaces between layers in the film. The conjunction elements can connect two connected elements at the same or different X-Y positions among the interfaces between layers. The conjunction elements can include any type elements to form an image such as lines, curves, or other types of elements. The conjunction elements are imaged between connected elements using an imaging system as described below. The connected elements at the interfaces between layers are registered in the Z-direction such that the conjunction elements appear as desired in the resulting 3D floating image film.

Figure 4:
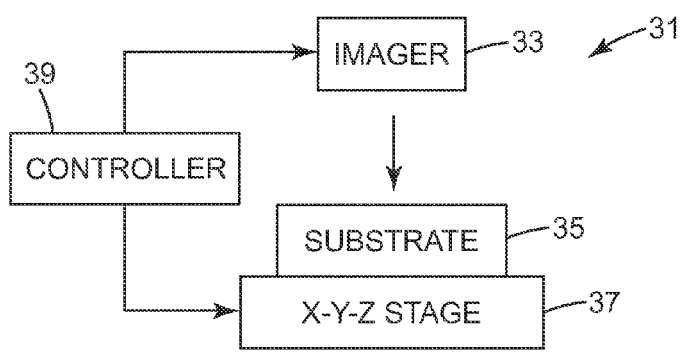
FIG. 4 is a diagram illustrating a system to write images to a 3D floating image multilayer film.

FIG. 4 is a diagram illustrating a system 31 to write images to a 3D floating image multilayer film. System 31 includes a laser imager 33 to write images to a substrate 35. An X-Y-Z stage 37 provides for movement of the substrate in the X-Y-Z directions during imaging. A controller 39 can control operation of imager 33 and movement of the substrate via X-Y-Z stage 37. Controller 39 can be implemented with a computer, or other processor-based device, and can be programmed with the information represented by Tables 1 and 2 to form an image with Z-direction registration. A system and method to write images in order to form a floating image films are described in U.S. Pat. No. 6,288,842.

EXAMPLES

The substrate for the films in the Examples included two sheets, sheet A and sheet B. Sheet A was a microlens array sheet (radius of curvature equal to 23.2 microns, the length from lens top to metal layer equal to 62 microns) with a wall around the lens as identified in Table 3 (microlens array). Sheet B was a retroreflective material (3M SCOTCHLITE reflective material 680-10, Sumitomo 3M Company, LTD.) as shown in Table 3. In Table 3, the parameter R is the radius of curvature of the microlenses from a cross-sectional view, and the parameter D is the diameter of the microlenses measured from a top view.

TABLE 3

| | R (microns) | D (microns) | Number of Lenses (/cm$^2$) |
|---|---|---|---|
| Sheet A (microlens array) | 22.3 | 42.3 | 30509.0 |
| Sheet B (SCOTCHLITE Product) | — | 71.4 | 15385.4 |

Images were written to the substrate for the films in the Examples as follows. Floating 3D images were formed on both sheet A and sheet B by the method disclosed in U.S. Pat. No. 6,288,842. In particular, the 3D images were formed with Nd:YAG laser at 1.06 microns-wavelength, an optics system including aspherical lens for image forming, triaxial (X-Y-Z) stage equipment to change the focal length of above-mentioned aspherical lens for image forming. The energy density on both sheet A and sheet B was about 8 mJ/cm$^2$.

Example 1

Figure 5:
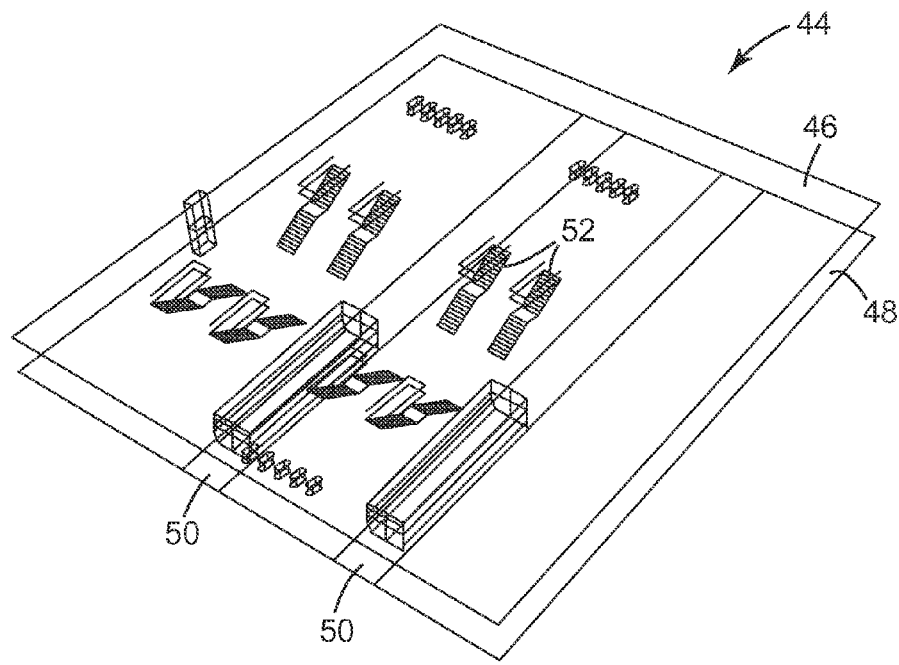
FIG. 5 is a design for a multilayer film showing a 3D floating image map for Example 1.

FIG. 5 is an example of a design 44 for connected elements in a multilayer film showing a 3D floating image map and formed using the system and method described above.

Design 44 represents a subway station and has a ground level 46 and a basement level 48 with tracks 50. Staircases 52 connect the ground and basement levels.

In the image of FIG. 5, elements of the same level of a floor are marked on the same layer of image as connected elements. Another element that belongs to the next level of a floor is marked on a next layer of the image with respect to the prior layer. Several levels of floors and associated connected elements can be marked in each layer. The registration for each layer is sufficiently maintained to be capable of identifying particular positions of the layers in the X-Y planar position. The gap to separate the interfaces among the layers should be, for example, about 5 mm and greater that is capable of identifying the differences of each layer.

The conjunction elements of the map, such as staircases, elevator shafts, and escalators are marked by connecting each layer through connected elements at the interfaces between layers. Some of the conjunction elements, such as staircases and escalators, are connecting different X-Y planar positions among two adjacent interfaces between layers. The floating image is written into the film while maintaining the X-Y-Z positions each layer and registration of the connected elements in the Z-direction.

Example 2

Figure 6:
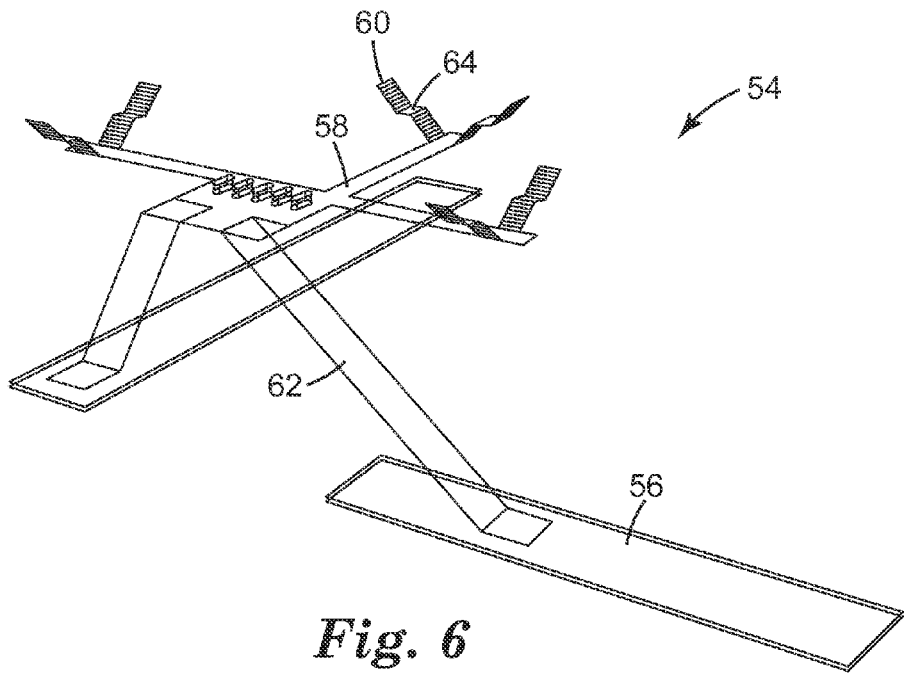
FIG. 6 is a design for a multilayer film showing a 3D floating image map for Example 2.

FIG. 6 is an example of a design 54 for connected elements in a multilayer film showing a 3D floating image map and formed using the system and method described above. Design 54 is more complicated than design 44 in that design 54 includes more levels. In particular, design 54 represents a subway station and has levels 56, 58, and 60. An escalator 62 connects levels 56 and 58, and a staircase 64 connects levels 58 and 60. In the image of FIG. 6, the same methodology as described for Example 1 was used to form the image having connected elements and conjunction elements registered in the Z-direction along with the registration for each layer being sufficiently maintained to be capable of identifying particular positions of the layers in the X-Y planar positions.

The invention claimed is:

1. A multilayer sheeting with a 3D floating image, comprising:
    at least one layer of microlenses, the layer having first and second sides;
    a multilayer material disposed adjacent the first side of the layer of microlenses, wherein the multilayer material comprises multiple adjacent layers having X-Y planar positions and a Z-direction orthogonal to the X-Y planar positions;
    individual images formed in the multilayer material associated with the plurality of the microlenses, wherein the individual images contrast with the material, wherein the individual images comprise connected elements at interfaces between the multiple layers and conjunction elements between the connected elements, and wherein the connected elements are registered in the Z-direction at the X-Y planar positions in the interfaces between the layers; and
    a composite image, provided by the individual images, that appears to unaided eye to be three-dimensional and floating above or below the sheeting, or both.

2. The multilayer sheeting of claim 1, wherein the sheeting is flexible.

3. The multilayer sheeting of claim 1, wherein the composite image also appears to the unaided eye to be at least in part in the plane of the sheeting.

4. The multilayer sheeting of claim 1, wherein the multilayer material is a radiation sensitive material.

5. The multilayer sheeting of claim 1, wherein the sheeting is an embedded lens sheeting.

6. The multilayer sheeting of claim 1, further comprising a reflective film on one side of the layer of microlenses.

7. The multilayer sheeting of claim 1, further comprising a protective overcoat on one side of the sheeting.

8. The multilayer sheeting of claim 1, wherein at least one of the conjunction elements connects two of the connected elements at a same X-Y planar position.

9. The multilayer sheeting of claim 1, wherein at least one of the conjunction elements connects two of the connected elements at different X-Y planar position.

10. The multilayer sheeting of claim 1, wherein the composite image comprises a map.

* * * * *